(12) United States Patent
Wu

(10) Patent No.: US 7,059,023 B1
(45) Date of Patent: Jun. 13, 2006

(54) BECKET WITH DUAL ADJUSTABLE HOOKS

(76) Inventor: Kuan Hui Wu, Rm. 3, Fl. 7, No. 139, Chienkuo N. Rd., Sec. 2, Taipei (TW)

(*) Notice: Subject to any disclaimer, the term of this patent is extended or adjusted under 35 U.S.C. 154(b) by 0 days.

(21) Appl. No.: 10/991,534

(22) Filed: Nov. 19, 2004

(51) Int. Cl.
*F16B 45/02* (2006.01)
*A44B 13/00* (2006.01)

(52) U.S. Cl. .................... 24/376; 24/370; 24/601.5
(58) Field of Classification Search ............ 294/82.19, 294/82.2, 82.33, 83 R; 24/370, 376, 3, 305, 24/600.9, 601.2, 265, 307, 395, 375, 601.5, 24/373, 599.5, 600.8, 82, 33, 241, 232; 70/16; 403/2, 66; A44B 13/00
See application file for complete search history.

(56) References Cited

U.S. PATENT DOCUMENTS

| | | | | |
|---|---|---|---|---|
| 974,950 A | * | 11/1910 | Carter | 24/600.7 |
| 1,808,163 A | * | 6/1931 | Gottfried | 222/20 |
| 3,392,554 A | * | 7/1968 | Williamson | 70/16 |
| 4,152,814 A | * | 5/1979 | Ito | 294/82.21 |
| 4,279,062 A | * | 7/1981 | Boissonnet | 24/305 |
| 4,372,016 A | * | 2/1983 | LaViolette et al. | 24/600.7 |

* cited by examiner

*Primary Examiner*—Robert J. Sandy
*Assistant Examiner*—Marcus Menezes
(74) *Attorney, Agent, or Firm*—Leong C. Lei

(57) ABSTRACT

An improved becket structure is provided. The becket contains a first adjustable hook member and a second adjustable hook member, both of which can be opened and closed by a mechanism. As such, it is very convenient for a user to replace a cable connected to either one of the adjustable hook members. In addition, the mechanism also enhances the becket's strength to withstand greater tensions.

1 Claim, 4 Drawing Sheets

BECKET WITH DUAL ADJUSTABLE HOOKS

BACKGROUND OF THE INVENTION (a) Technical Field of the Invention

The present invention generally relates to beckets and, more particularly, to beckets with dual adjustable hooks.

(b) Description of the Prior Art

Hoisting hooks or beckets are widely utilized in all sorts of linking applications such as those used on a harness or spring line. FIG. 1 is a perspective diagram showing the structure of a conventional becket. As shown in FIG. 1, the becket contains a ring member 120, an adjustable hook member 140, and a locking device 160. During application, a cable has one of its ends fixedly attached to the ring member 120 through stitching or other means. The locking device 160 is a cylindrical swivel with a rotary opening 162 to control the open and close of the adjustable hook member 140. When the opening 162 is rotated to a specific position, the adjustable hook member 140 could be opened to receive another cable.

As described, a cable is fixedly attached to the ring member 120, and another cable could be connected to or disconnected from the adjustable hook member 140 conveniently. The foregoing design has a serious shortcoming. As the ring member 120 is fixedly attached to a cable, when the cable is broken, both the cable itself and the becket, which could still be in perfect condition, become worthless and have to be thrown away. This is not only a significant waste, but also a threat to the environmental protection.

Accordingly, there is a need for a new becket structure so that the becket does not need to be thrown away along with the cable or rope fixedly attached to it.

SUMMARY OF THE INVENTION

A major objective of the present invention is to provide an improved becket structure. The becket in accordance with the present invention contains a first adjustable hook member for connecting a first cable and a second adjustable hook member for connecting a second cable. Both the first and second adjust hook members could be opened and closed with a locking mechanism. The becket according to the present invention, therefore, is not fixedly attached to any one of the cables and could be recovered for further use even though any one of the cables is broken. This design has increased the becket's functionality and convenience significantly.

Another objective of the present invention is to provide an improved locking mechanism so that the adjustable hook members have enhanced strength to sustain heavier loads.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

Detailed Description of the Preferred Embodiments

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims. In the following, detailed description along with the accompanied drawings is given to better explain preferred embodiments of the present invention.

Figure 1:
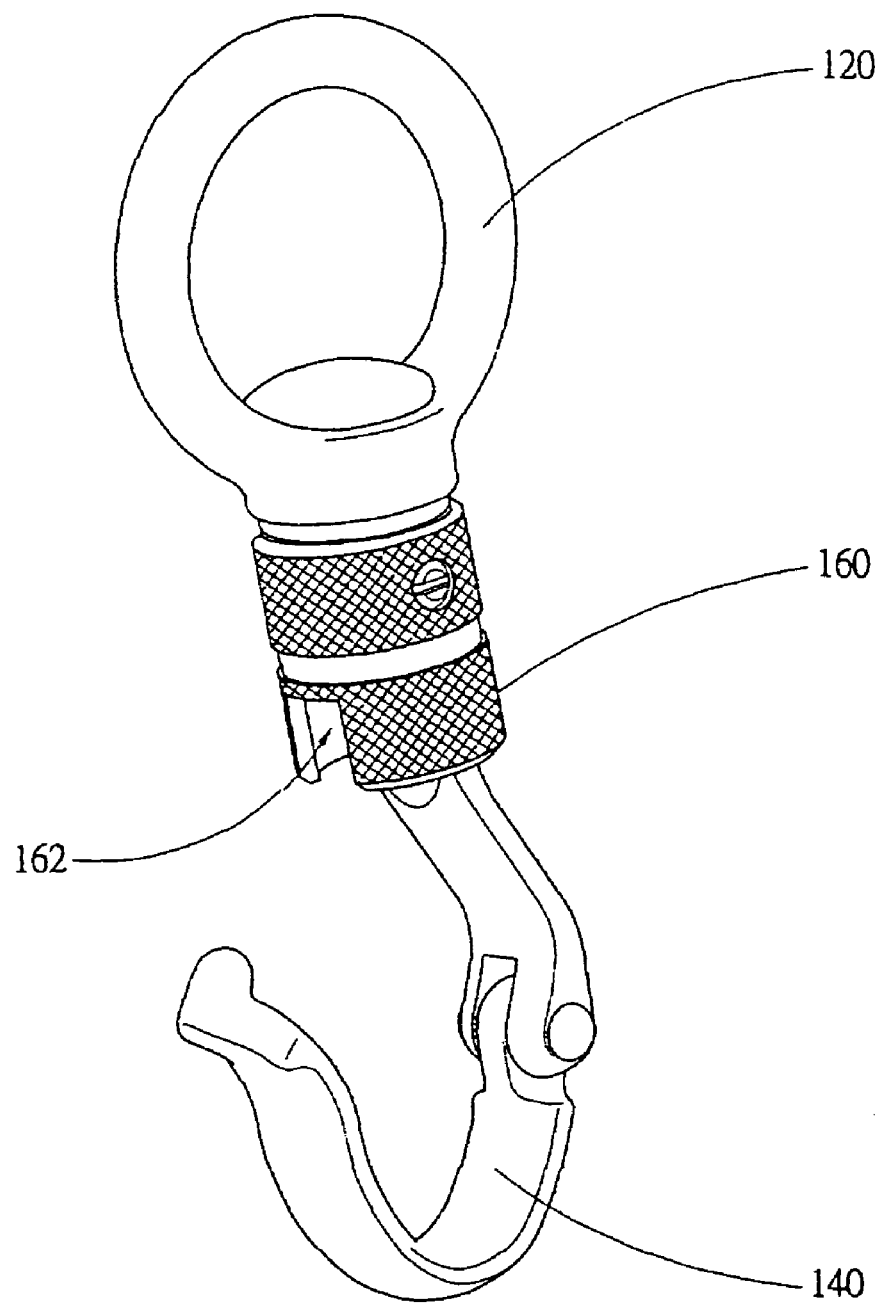
FIG. 1 is a perspective diagram showing the structure of a conventional becket.
Figure 2A:
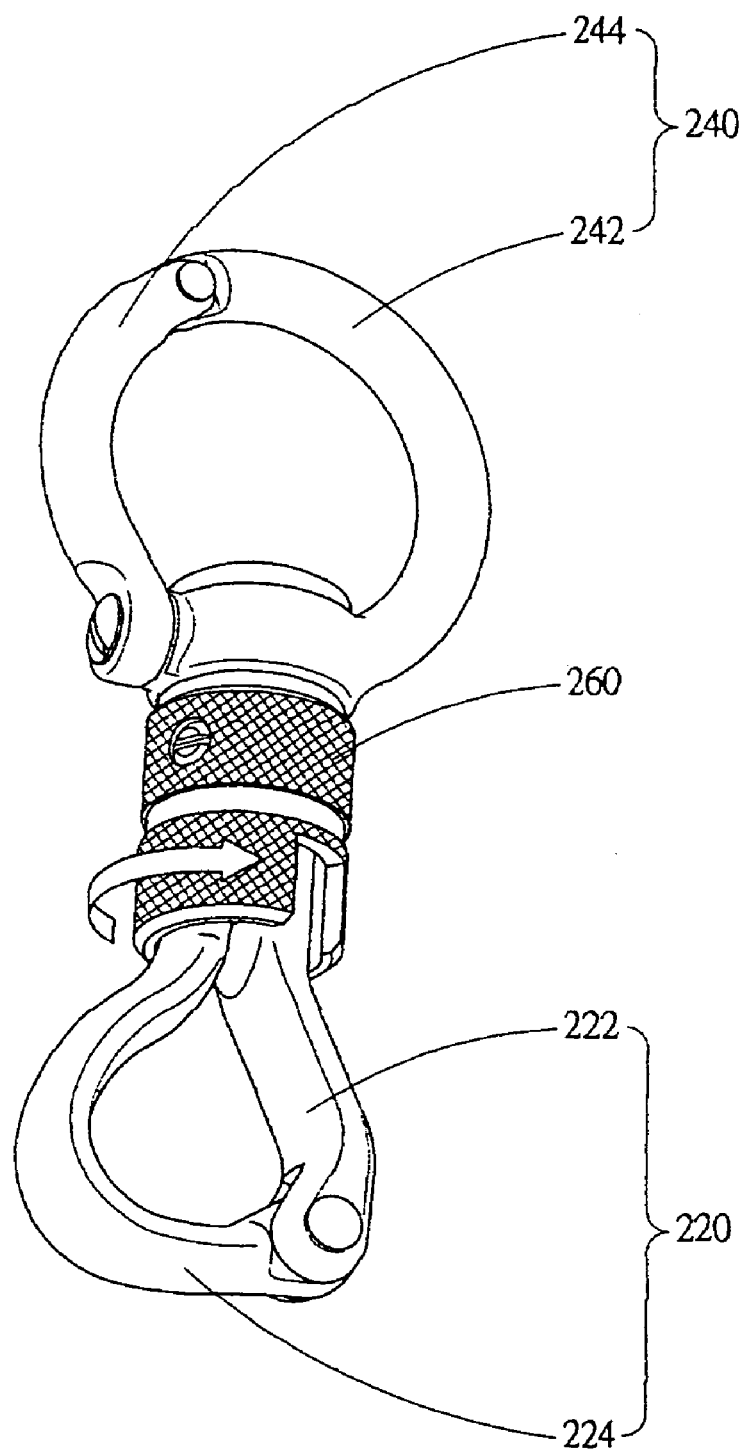
FIGS. 2A, 2B and 2C are perspective diagrams showing the structure of a becket according to the present invention.
Figure 2B:
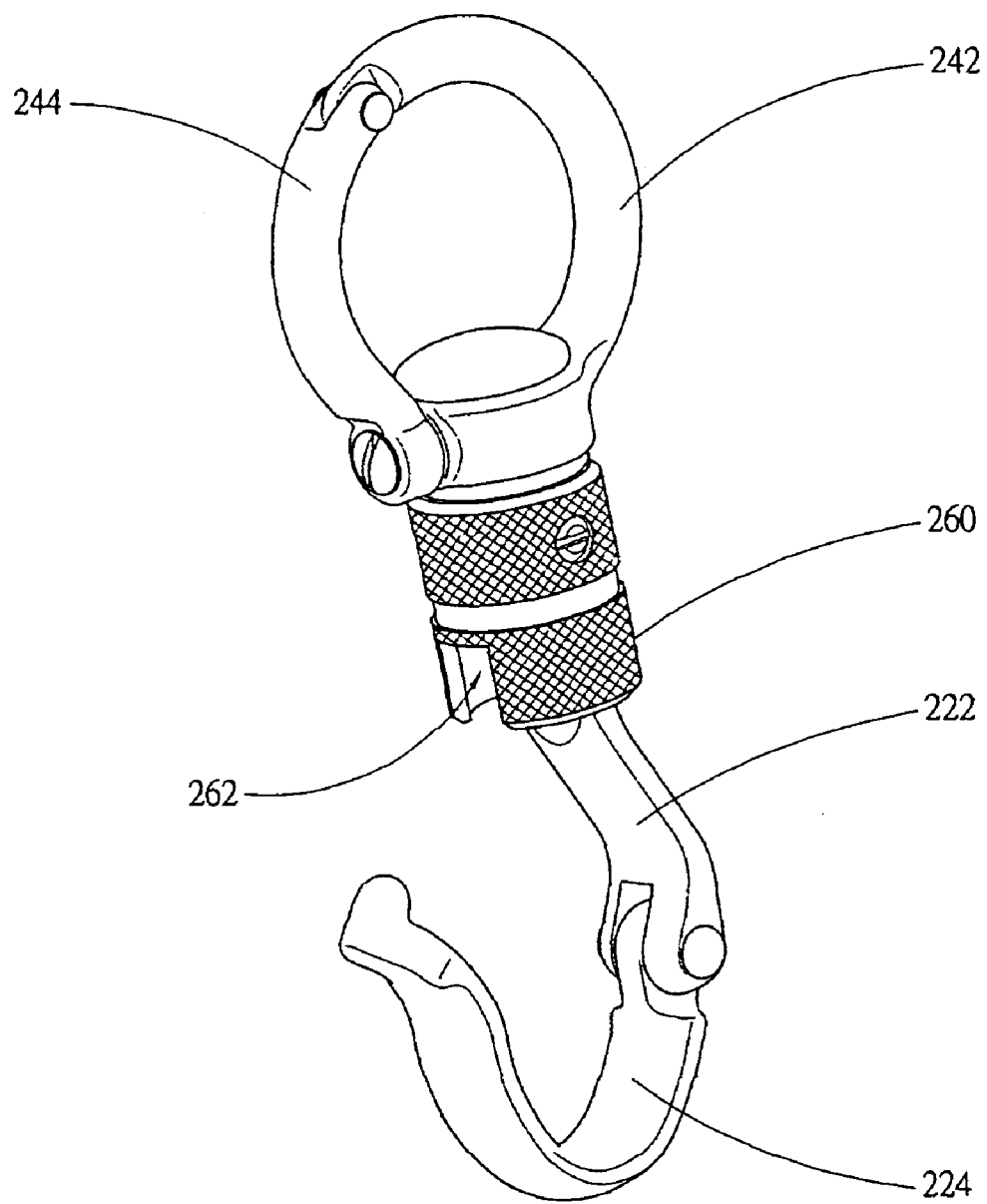
Figure 2C:
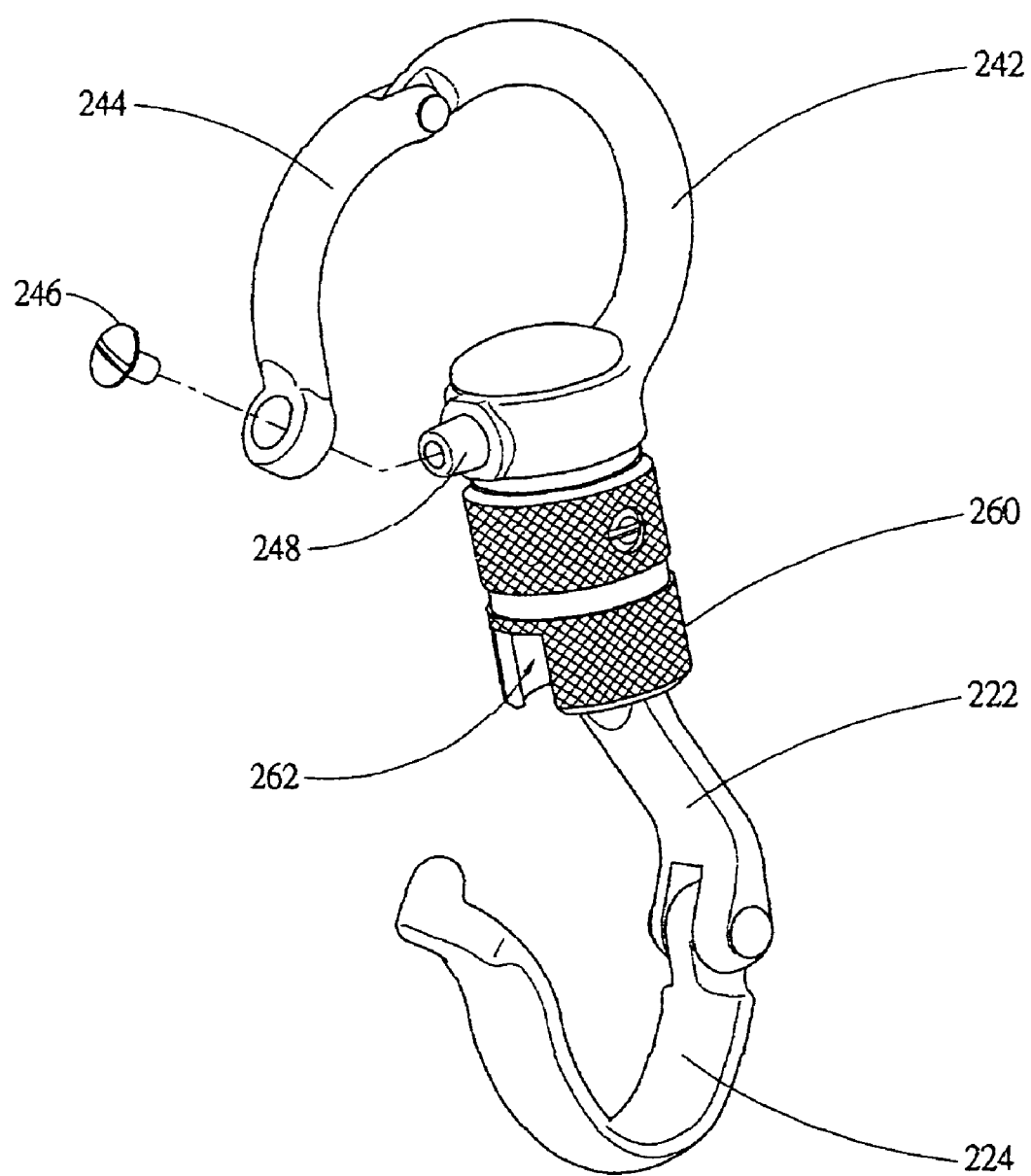

FIGS. 2A to 2C are perspective diagrams showing the structure of a becket according to the present invention. As shown in FIG. 2A, the becket according to the present invention contains a first adjustable hook member 220 and a second adjustable hook member 240. The first adjustable hook member 220 further contains a first shank member 222 and a second shank member 224. An end of the second shank member 224 is connected to an end of the first shank member 222. This connection forms a pivot so that the second shank member 224 could swing around it.

The becket further contains a locking device 260, which could swivel freely, for example, along the arrow direction depicted in FIG. 2A. The locking device 260 could further contain a lodging mechanism (not shown in FIGS. 2A to 2C) such as a mortise or notch, when the locking device 260 is swiveled to a specific position, the locking device is lodged in that position. The locking device 260 further contains an opening 262. When the locking device 260 is swiveled so that the opening 262 is at a specific position, the first adjustable hook member 220 could be released from the locking device 260 by swinging open the second shank member 224, as shown in FIG. 2B. The first adjustable hook member 220 then could receive a cable, rope, or the like. The second shank member 224 is then swung back to close the first adjustable hook member 220 and, when the locking device 260 is swiveled so that the opening 262 is away from that specific position, the cable, rope, or the like already received would not break away from the first adjustable hook member 220. Again, when the locking device 260 is swiveled so that the opening 262 is at that specific position, the cable, rope, or the like could be detached from the first adjustable hook member 220.

The second adjustable hook member 240 further contains a third shank member 242 and a fourth shank member 244. An end of the fourth shank member 244 is connected to an end of the third shank member 242. This connection forms a pivot so that the fourth shank member 244 could swing around it. The third shank member 242 has the other end, which is a ring, encircling the other end of the first shank member 222 of the first adjustable hook member 220. The second adjustable hook member 240 therefore can swivel freely.

The second adjustable hook member 240 further contains a bolt member 246, and a tubular element 248 on the circumference of the third shank member 242's ring end, as shown in FIG. 3C. As described earlier, an end of the fourth shank member 244 is connected to the third shank member 242. The other end of the fourth shank member 244 has a ring portion. The bolt member 246, the ring end of the fourth shank member 244, and the cylinder element 248 are arranged so that the bolt member 246 could fasten the ring end of the fourth shank member 244 to the tubular element 248. Therefore, to receive a cable or the like by the second adjustable hook member 240, the bolt member 246 could be unscrewed and the fourth shank member 244 could be swung upwardly to open the second adjustable hook member 240. After receiving the cable, the bolt member 246 fastens the fourth shank member 244 to the tubular element 248 and the cable is firmly attached to the second adjustable hook member 240.

If the cable is broken afterwards, the bolt member 246 is unscrewed to open the second adjustable hook member 240, and the broken cable could be removed conveniently. Similarly, if a cable connected to the first adjustable hook member 220 is broken, it can also be removed conveniently by opening the first adjustable hook member 220. In this way, unlike the conventional becket, the becket according to the present invention could be recovered for further use when one of its attaching cables is broken. Furthermore, according to the foregoing design, the tubular element 248, besides for fastening the fourth shank member 244, could also enhance the strength of the second adjustable hook member 240 to withstand greater tensions.

In summary, the becket according to the present invention contains a first adjustable hook member, a second adjustable hook member, a locking device, and a bolt-fastening mechanism. The locking device controls the open and close of the first adjustable hook member. The bolt-fastening mechanism controls the open and close of the second adjustable hook member. As described, since both the first and second adjustable hook members could be opened and closed, it is very convenient for a user to replace a cable connected to either one of the adjustable hook members, and the becket therefore will not have to be thrown away because one of the connecting cables is broken, or for any other reason. The becket according to the present invention contributes to better resource utilization and presents less of a treat to the environment. In addition, the bolt-fastening mechanism not only fastens the second adjustable hook member, but also enhances the second adjustable hook member's strength to withstand greater tensions.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A becket with adjustable hooks comprising:
   a first adjustable hook member having a first shank member and a second shank member, said first shank member having a first end being pivotally connected with a first end of said second shank member;
   a second adjustable hook member having a third shank member and a fourth shank member, said third shank member having a first end being pivotally connected with a first end of said fourth shank member, said third shank member having a second end provided with a ring encircling a second end of said first shank member of said first adjustable hook member thereby enabling said second adjustable hook member to rotate freely with respect to said first adjustable hook member, said ring having a circumference provided with a tubular element, said fourth shank member having a second end formed with a ring portion adapted to engage with said tubular element, a bolt member for fastening said ring portion of said fourth shank member to said tubular element of said third shank member; and
   a locking device rotatably mounted on said first adjustable member and having an opening allowing passage of a second end of said second shank member.

* * * * *